UNITED STATES PATENT OFFICE.

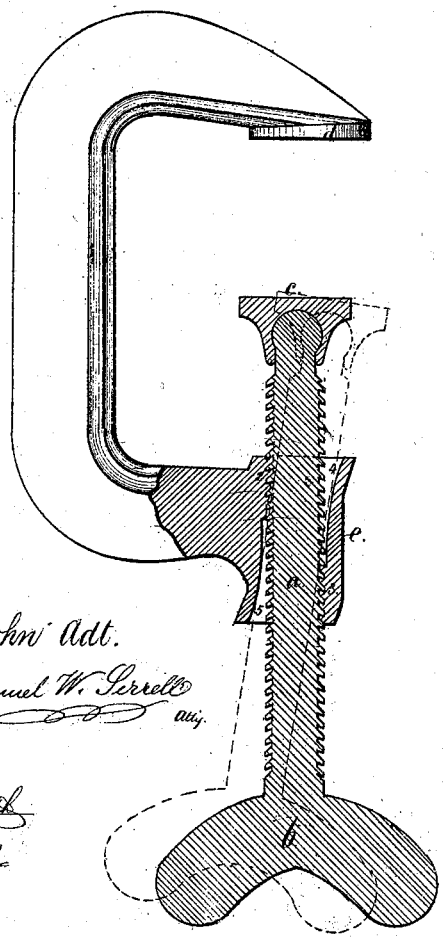

JOHN ADT, OF NEW HAVEN, CONNECTICUT, ASSIGNOR TO THE JUDD MANUFACTURING COMPANY, OF SAME PLACE.

IMPROVEMENT IN SCREWS AND NUTS FOR CLAMPS, &c.

Specification forming part of Letters Patent No. 98,656, dated January 11, 1870.

*To all whom it may concern:*

Be it known that I, JOHN ADT, of New Haven, in the State of Connecticut, have invented and made an Improvement in Screws and Nuts for Clamps, Bench-Vises, Wrenches, &c.; and I do hereby declare the following to be a correct description thereof.

The object of this invention is to allow the screw to slide freely endwise through the nut when setting the screw up toward the article to be grasped or clamped, thereby avoiding the loss of time and wear consequent upon revolving the screw as usual, and then by turning the screw at a different angle to the nut the thread of the screw is brought into the sectional threads within the nut, and the shape of the thread is such that the pressure, in clamping the article, does not tend to change the angle of the nut to the screw.

In the drawing I have represented the screw and nut as applied to a clamp, the same being shown sectionally.

$a$ is the screw, to be rotated by the head $b$, or in any convenient manner, and $c$ is the button at the end of the screw to prevent injury to the article compressed between the screw and the clamp $d$.

The nut or screw-tube $e$ is made with screw-threads at the parts 2 and 3, that are at opposite sides and ends of the inside of the screw-tube $e$, and at 4 and 5 the hole through said tube is widened, in order that the screw $a$ itself may be moved endwise freely through the nut or tube $e$ when standing at an inclination or diagonally to the normal position, as shown by dotted lines, in which position the screw does not come into contact with the sectional threads at 2 and 3; but when the said screw is turned so that its threads take into the sectional threads 2 and 2, the power of the screw, as rotated, will be exerted to clamp or hold whatever article it may be applied to. The screw-threads are not to be inclined, as usual, but are to be sectionally like two hooks, one side of the thread being conical and the other side slightly undercut, as shown. This prevents the screw slipping off the sectional threads when under pressure.

This character of a screw, when applied to a vise, wrench, or clamp, may be made with the nut or tube with the sectional screw as a part of the moving jaw or acting upon the same.

I claim as my invention—

The nut or tube $e$, with screw-threads at opposite sides and ends of the interior, and widened at the portions 4 and 5, in combination with screw $a$, substantially as and for the purposes set forth.

Signed this 1st day of November, A. D. 1869.

JOHN ADT. [L. S.]

Witnesses:
H. LYNDE HARRISON,
D. R. WRIGHT.